(12) United States Patent
Xu et al.

(10) Patent No.: US 12,448,502 B2
(45) Date of Patent: *Oct. 21, 2025

(54) RUBBER COMPOSITION, PROCESSING METHOD THEREOF, SEALING ELEMENT USING THE SAME

(71) Applicants: HANGZHOU XINGLU TECHNOLOGY CO., LTD., Zhejinag (CN); SHAOXING PINGHE NEW MATERIAL TECHNOLOGY CO., LTD., Zhejiang (CN)

(72) Inventors: Tao Xu, Hangzhou (CN); Zhi Sheng Fu, Hangzhou (CN); An Yang Wu, Hangzhou (CN)

(73) Assignees: HANGZHOU XINGLU TECHNOLOGIES CO., LTD, HANGZHOU (CN); SHAOXING PINGHE NEW MATERIAL TECHNOLOGY CO., LTD., Shaoxing (CN)

( * ) Notice: Subject to any disclaimer, the term of this patent is extended or adjusted under 35 U.S.C. 154(b) by 91 days.

This patent is subject to a terminal disclaimer.

(21) Appl. No.: 16/477,599

(22) PCT Filed: Jan. 12, 2018

(86) PCT No.: PCT/CN2018/072346
§ 371 (c)(1),
(2) Date: Jul. 12, 2019

(87) PCT Pub. No.: WO2018/130186
PCT Pub. Date: Jul. 19, 2018

(65) Prior Publication Data
US 2019/0338110 A1    Nov. 7, 2019

(30) Foreign Application Priority Data

Jan. 13, 2017  (CN) .......................... 201710024695.0
Jan. 10, 2018  (CN) ........................ 201810020846.X

(51) Int. Cl.
| | |
|---|---|
| *C08L 23/06* | (2006.01) |
| *B29D 99/00* | (2010.01) |
| *B60S 1/04* | (2006.01) |
| *C08K 3/011* | (2018.01) |
| *C08K 3/013* | (2018.01) |
| *C08K 3/04* | (2006.01) |
| *C08K 3/22* | (2006.01) |
| *C08K 3/26* | (2006.01) |
| *C08K 3/34* | (2006.01) |

(Continued)

(52) U.S. Cl.
CPC .......... *C08L 23/06* (2013.01); *B29D 99/0053* (2013.01); *B60S 1/04* (2013.01); *C08K 3/011* (2018.01); *C08K 3/013* (2018.01); *C08K 3/04* (2013.01); *C08K 3/346* (2013.01); *C08K 5/0016* (2013.01); *C08K 5/0025* (2013.01); *C08K 5/005* (2013.01); *C08K 5/14* (2013.01); *C08K 5/34924* (2013.01); *C08L 23/08* (2013.01); *C08L 23/16* (2013.01); *C08K 2003/2206* (2013.01); *C08K 2003/2217* (2013.01); *C08K 2003/2296* (2013.01); *C08K 2003/265* (2013.01)

(58) Field of Classification Search
CPC ........ C08K 5/0016; C08K 3/22; C08K 3/346; C08K 5/0025; C08K 3/013; C08K 5/34924; C08K 5/14; C08K 3/04; C08K 3/011; C08K 5/005; C08K 3/06; C08K 3/26; C08K 5/09; C08K 2003/265; C08K 2003/2217; C08K 2003/2206; C08K 2003/2296; C08K 2003/222; C08K 2201/014; B29D 99/0053; B60S 1/04; C08L 23/08; C08L 23/16; C08L 23/06; C08L 23/04; C08L 91/00; C08L 71/02
See application file for complete search history.

(56) References Cited

U.S. PATENT DOCUMENTS 3,758,643 A  * 9/1973 Fischer .................... C08K 5/14
                                                        525/51
3,806,558 A    4/1974 Fischer
(Continued)

FOREIGN PATENT DOCUMENTS

CN       1699053 A    11/2005
CN     101028888 A     9/2007
(Continued)

OTHER PUBLICATIONS

Derwent Abstract for CN 102585390 (Year: 2012).*
(Continued)

*Primary Examiner* — Angela C Scott
(74) *Attorney, Agent, or Firm* — Ingrassia Fisher & Lorenz, LLP

(57) ABSTRACT

The invention discloses a rubber composition and a method for processing the rubber composition, and a sealing element using the rubber composition and a production method thereof. The rubber composition comprises, in parts by weight, 100 parts of a rubber matrix, 2-20 parts of a cross-linking system, 60-300 parts of a reinforcing filler, 20-170 parts of a plasticizer and 3-25 parts of a metal oxide, wherein, the rubber matrix comprises a branched polyethylene with a content represented as A, in which $0<A \leq 100$ parts, and both an EPM rubber and an EPDM rubber with a total content represented as B, in which $0 \leq B < 100$ parts. The invention provides a sealing element with good compression set resistance.

14 Claims, No Drawings

(51) Int. Cl.
*C08K 5/00* (2006.01)
*C08K 5/14* (2006.01)
*C08K 5/3492* (2006.01)
*C08L 23/08* (2025.01)
*C08L 23/16* (2006.01)

(56) References Cited

U.S. PATENT DOCUMENTS

| | | | |
|---|---|---|---|
| 4,128,523 A | 12/1978 | Britton et al. | |
| 5,866,663 A * | 2/1999 | Brookhart | C08F 210/02 |
| | | | 526/170 |
| 6,103,658 A | 8/2000 | Mackenzie et al. | |
| 6,455,616 B1 * | 9/2002 | Cogen | C08K 5/14 |
| | | | 524/100 |
| 6,660,677 B1 | 12/2003 | Mackenzie et al. | |
| 12,173,144 B2 * | 12/2024 | Xu | C08L 23/06 |
| 12,180,355 B2 * | 12/2024 | Xu | C08K 5/09 |
| 2006/0074177 A1 | 4/2006 | Dharmarajan et al. | |
| 2019/0330456 A1 * | 10/2019 | Xu | C08K 3/013 |
| 2019/0338109 A1 * | 11/2019 | Xu | C08L 23/06 |
| 2019/0359805 A1 * | 11/2019 | Xu | C08K 3/36 |
| 2019/0359806 A1 * | 11/2019 | Xu | F16F 1/3605 |
| 2019/0359810 A1 * | 11/2019 | Xu | B65G 15/32 |
| 2019/0367717 A1 * | 12/2019 | Xu | B29D 29/06 |
| 2020/0123353 A1 * | 4/2020 | Xu | B32B 1/08 |
| 2020/0123354 A1 * | 4/2020 | Xu | C08L 23/06 |
| 2020/0123362 A1 * | 4/2020 | Xu | C08J 9/105 |
| 2020/0332104 A1 * | 10/2020 | Xu | C08K 3/04 |

FOREIGN PATENT DOCUMENTS

| | | | |
|---|---|---|---|
| CN | 101531725 A | | 9/2009 |
| CN | 101812145 A | | 8/2010 |
| CN | 102585390 | * | 7/2012 |
| CN | 102827312 A | | 12/2012 |
| CN | 103980596 A | | 8/2014 |
| CN | 104277337 A | | 1/2015 |
| CN | 104710693 A | | 6/2015 |
| CN | 104877225 | * | 9/2015 |
| CN | 104877225 A | | 9/2015 |
| CN | 104910487 A | | 9/2015 |
| CN | 104926962 A | | 9/2015 |
| JP | 59215342 A | | 12/1984 |
| JP | S59215342 A | | 12/1984 |

OTHER PUBLICATIONS

English Machine Translation for CN 104877225 (Year: 2015).*
SIPO, International Search Report issued in IA Application No. PCT/CN2018/072346, mailed Apr. 19, 2021.

* cited by examiner

RUBBER COMPOSITION, PROCESSING METHOD THEREOF, SEALING ELEMENT USING THE SAME

CROSS REFERENCE TO RELATED APPLICATIONS

The present application is the U.S. national phase of and claims priority to International Patent Application No. PCT/CN2018/072346 filed Jan. 12, 2018, which claims the benefit of priority from China National Application No. 201710024695.0, filed on Jan. 13, 2017 and China National Application No. 201810020846.X, filed on Jan. 10, 2018, the entire content of each of which is incorporated herein by reference into the present disclosure as if fully set forth herein.

TECHNICAL FIELD

The invention relates to the technical field of rubber, in particular relates to a rubber composition and a processing method thereof, and relates to a sealing element using the rubber composition and a producing method thereof.

BACKGROUND

The application occasion of rubber sealing generally requires that products should have better aging resistance and lower compression set so as to obtain long-term reliable sealing. At present, many sealing products are made from ethylene propylene rubber. Compared with a sulfur vulcanization system, rubber products obtained by a peroxide crosslinking system have better aging resistance and lower compression set. However, the mechanical strength of the products obtained by peroxide crosslinking is generally weaker than that of the products obtained by sulfur vulcanization, so that the products are easy to break or tear in production and use processes.

How to simultaneously improve the aging resistance, mechanical strength and compression set resistance of the ethylene propylene rubber is a problem to be solved.

Ethylene propylene rubber is a kind of synthetic rubber with a saturated molecular backbone, and includes ethylene propylene monomer (EPM) and ethylene-propylene-diene monomer (EPDM), both of which have good aging resistance. The EPDM is commonly used in ethylene propylene rubber products. However, since the EPDM contains a third monomer with a molecular chain having a double bond and the EPM has a completely saturated molecular chain, the EPM has more excellent aging resistance. Therefore, in a situation where a higher requirement is raised for the aging resistance, it is a common technical solution to use the EPM to improve the aging resistance of the EPDM. However, the mechanical strength of the EPM is low, which affects the overall physical and mechanical properties.

The EPM is a copolymer of ethylene and propylene, which is a copolymer of ethylene and α-olefin. The copolymer of ethylene and α-olefin is a polymer containing only carbon and hydrogen elements and having a saturated molecular chain. The common types of carbon atoms found in such polymers generally include primary carbon, secondary carbon and tertiary carbon, in which the tertiary carbon atoms are most susceptible to hydrogen abstraction to form free radicals. Accordingly, the proportion of the tertiary carbon atoms in all carbon atoms is generally considered to be a main factor affecting the aging resistance of the copolymer of ethylene and α-olefin. The lower the proportion is, the better the aging resistance will be. The proportion can be expressed by the degree of branching. For example, the EPM having a propylene content of 60% by weight can be calculated to contain 200 propylene units, i.e. 200 tertiary carbon atoms or 200 methyl branches, per 1000 carbon atoms, so the degree of branching is 200 branches/1000 carbon atoms. The EPM usually has an ethylene content of 40 to 65% or 40 to 60% by weight, so the degree of branching is generally in the range of 117 to 200 branches/1000 carbon atoms or 133 to 200 branches/1000 carbon atoms. This degree of branching is considered to be higher than that of other common copolymers of ethylene and α-olefin.

In the prior art, the α-olefin in the common copolymers of ethylene and α-olefin may include, in addition to propylene, α-olefin having a carbon atom number of not less than 4, which may be selected from $C_4$-$C_{20}$ α-olefin, and is generally selected from 1-butylene, 1-hexene and 1-octylene. If the degree of branching of a copolymer of ethylene and α-olefin is too low, the melting point and the crystallinity are too high, so it is not suitable for use as a rubber component. If the degree of branching is too high, the content of α-olefin is higher, which leads to higher process difficulty and raw material cost, and lower operability and economical efficiency. In the prior art, polyolefin obtained by copolymerizing ethylene with 1-butylene or ethylene with 1-octylene can be referred to as a polyolefin plastomer or a polyolefin elastomer according to the magnitudes of crystallinity and melting points. Due to their proper crystallinity and melting points, some polyolefin elastomer brands can be well used in combination with the ethylene propylene rubber and have a lower degree of branching, so they are considered to be an ideal material for improving the aging resistance of the ethylene propylene rubber, and can be used in place of the ethylene propylene rubber to some extent. Since a copolymer of ethylene and 1-octylene has more flexible molecular chain, higher rubber elasticity, and better physical and mechanical properties than a copolymer of ethylene and 1-butylene, the polyolefin elastomer commonly used in rubber products is generally a copolymer of ethylene and 1-octylene at present, in which the octylene content in percentage by weight is generally not higher than 45%, and more generally not higher than 40%, and the corresponding degree of branching is generally not higher than 56 branches/1000 carbon atoms, and more generally not higher than 50 branches/1000 carbon atoms, which is much lower than the degree of branching of the EPM.

Therefore, the copolymer of ethylene and 1-octylene has excellent aging resistance and good physical and mechanical properties.

The rubber are usually used after crosslinking. Among common crosslinking methods for the ethylene propylene rubber, peroxide crosslinking or radiation crosslinking can be suitably used for the copolymer of ethylene and α-olefin, both of which mainly comprise: forming a tertiary carbon free radical by hydrogen abstraction from tertiary carbon and then creating a carbon-carbon crosslink by free radical bonding. However, the copolymer of ethylene and 1-octylene (hereinafter referred to as POE) has a small number of tertiary carbon atoms and has long branches attached to the tertiary carbon atoms, so the steric hindrance is large, and free radical reaction is difficult to occur, resulting in difficulty in crosslinking, thus affecting the processing efficiency and product properties. For example, the compression set resistance is unsatisfactory.

Therefore, there is currently a need for a better technical solution, which can improve the aging resistance of the ethylene propylene rubber while the rubber composition has better physical and mechanical properties and crosslinking properties, and has good compression set resistance.

Furthermore, the compression set is also related to the molecular weight distribution of the ethylene propylene rubber, and the ethylene propylene rubber having narrow molecular weight distribution has relatively low compression set. The molecular weight distribution of the ethylene propylene rubber is mostly 3 to 5 and can be up to 8 to 9. The molecular weight distribution of a small amount of ethylene propylene rubber is close to 2 and the processing is convenient, but the cost is higher. Theoretically, the smallest molecular weight distribution of a polymer can be close to 1, so that the material selection of a sealing element can be further optimized to better realize a sealing effect. The Chinese patent 201410200113.6 discloses polyethylene rubber and a processing method thereof, specifically discloses a raw material formula and a processing method of polyethylene rubber, but does not disclose novel sealing element obtained by using a rubber matrix containing the rubber, and a method for preparing a sealing element. The formula disclosed by this patent can not well meet the process requirements of the sealing element processed by means of rapid extrusion, and is higher in rubber content and higher in cost.

At present, the public report of using the advantage of narrow molecular weight distribution of the branched polyethylene to prepare a sealing element with good compression set resistance has not been seen.

SUMMARY

In view of the problems existing in the prior art, the present invention provides a rubber composition, a processing method for obtaining the rubber composition, a sealing element including the rubber composition, and a production method of the sealing element. The branched polyethylene having a degree of branching of not less than 50 branches/1000 carbon atoms is used for replacing a part of or all of ethylene propylene rubber, good processability is achieved, and simultaneously, a sealing element with good compression set resistance is obtained.

In order to achieve the objectives, the present invention adopts the following technical solution: A rubber composition includes a rubber matrix and essential components in parts by weight. The rubber matrix includes A parts of branched polyethylene, in which 0<A≤100, and B parts of EPM and EPDM, in which 0≤B<100. Based on 100 parts by weight of the rubber matrix, the essential components include 2 to 20 parts of a crosslinking system, 60 to 300 parts of a reinforcing filler, 20 to 170 parts of a plasticizer, and 3 to 25 parts of a metal oxide. The branched polyethylene has a degree of branching of not less than 50 branches/1000 carbon atoms, a weight average molecular weight of not less than 50,000, and a Mooney viscosity ML(1+4) at 125° C. of not less than 2. The crosslinking system includes a crosslinking agent and an auxiliary crosslinking agent.

"Branched polyethylene" in the prior art can also refer to a saturated vinyl copolymer with branches in addition to an ethylene homopolymer with branches, such as an ethylene-α-olefin copolymer, which can be POE. Although the POE performs well in physical and mechanical properties and aging resistance, the crosslinking properties are poor. Therefore, although the branched polyethylene of the present invention can include both a branched ethylene homopolymer and the POE, it is preferred that the branched polyethylene includes a high proportion of or exclusively a branched ethylene homopolymer. In a preferred technical solution of the present invention, the branched polyethylene includes exclusively a branched ethylene homopolymer.

In the further elaboration of the technical solution of the present invention, unless otherwise specified, the used branched polyethylene is a branched ethylene homopolymer.

The branched polyethylene used in the present invention is a kind of ethylene homopolymer having a degree of branching of not less than 50 branches/1000 carbon atoms, which may also be referred to as Branched Polyethylene or Branched PE. Currently, the synthesis method mainly comprises the step of catalyzing ethylene homopolymerization based on a "chain walking mechanism" in the presence of a late transition metal catalyst. Preferably, the late transition metal catalyst is an (α-diimine) nickel/palladium catalyst. The nature of the chain walking mechanism refers to the fact that a n-hydrogen elimination reaction and a re-insertion reaction tend to occur in a process of catalyzing olefin polymerization in the presence of a late transition metal catalyst, such as an (α-diimine)nickel/palladium catalyst, thereby generating branches. The branches of the branched polyethylene based on the backbone may have different numbers of carbon atoms, and specifically 1 to 6 or more carbon atoms.

The production cost of the (α-diimine) nickel catalyst is significantly lower than that of the (α-diimine) palladium catalyst, and the (α-diimine) nickel catalyst has a high rate and high activity in catalyzing ethylene polymerization, and is thus more suitable for industrial application. Therefore, in the present invention, the (α-diimine) nickel catalyst is preferably used in preparation of the branched polyethylene by catalyzing ethylene polymerization.

The degree of branching of the branched polyethylene used in the present invention is preferably 50 to 130 branches/1000 carbon atoms, further preferably 60 to 130 branches/1000 carbon atoms, and further preferably 60 to 116 branches/1000 carbon atoms. The degree of branching of the branched polyethylene used in the present invention is between the degree of branching of the POE and the degree of branching of the EPM, constituting a new technical solution that is different from the prior art. Therefore, the rubber matrix of present invention has both excellent aging resistance and good crosslinking properties.

The crosslinking properties include factors such as crosslinking density and crosslinking rate, and are the specific properties of the crosslinking capability of the rubber matrix in the processing process.

The branched polyethylene used in the present invention preferably has a methyl branch content of 40% or more or 50% or more, and has a similarity in structure with the EPM. In terms of the crosslinking capability, the degree of branching (the content of tertiary carbon atoms) and the steric hindrance around the tertiary carbon atoms are the two main factors affecting the crosslinking capability of saturated polyolefin. Compared with the EPM, the branched polyethylene used in the present invention has a lower degree of branching, and since the branched polyethylene has branches with the carbon number of not less than 2, the steric hindrance around the tertiary carbon atoms of the branched polyethylene used in the present invention is theoretically greater than that of the EPM. Taking the two factors into account, it can be inferred that the crosslinking capability of the branched polyethylene used in the present invention is weaker than that of the EPM and further weaker than that of the EPDM. However, the actual crosslinking capability of the partially branched polyethylene used in the present invention is close to, and can even be equal to or better than that of the EPDM. This means that the rubber composition of the present invention can achieve good aging resistance while the crosslinking capability is not weakened, and can even have excellent crosslinking properties to achieve unexpected beneficial effects.

This may be explained by the fact that there may be an appropriate number of secondary branch structures on the branched polyethylene used in the preferred technical solution of the present invention. The so-called secondary branch structure refers to a branch structure that further exists on a branch, which is formed in the chain walking process. This structure is also called "branch-on-branch". Because the steric hindrance around the tertiary carbon atoms of the secondary branch is low, a crosslinking reaction is more likely to occur. Having a secondary branch structure is a significant distinction of the branched polyethylene used in the preferred technical solution of the present invention from the EPM or the conventional ethylene-α-olefin copolymer in the prior art.

It is a new technical solution to improve the crosslinking capability of a saturated polyolefin elastomer by using the secondary branch structure with lower steric hindrance. According to the technical solution of the present invention, it is also considered to be within the technical protection scope of the present invention to include a vinyl copolymer having a secondary branch structure or other saturated hydrocarbon polymers in the rubber matrix. The vinyl copolymer refers to a copolymer of ethylene and α-olefin with branches and has a secondary branch structure, wherein the α-olefin with branches may be selected from isobutylene, 3-methyl-1-butene, 4-methyl-1-pentene, 3-methyl-1-pentene, 2-methyl-1-heptene, 3-methyl-1-heptene, 4-methyl-1-heptene, 5-methyl-1-heptene, 6-methyl-1-heptene and the like, and the comonomer may also simultaneously include common linear chain α-olefin.

It is generally believed in the prior art that the branched polyethylene prepared in the presence of the (α-diimine) nickel catalyst is difficult to have a secondary branch structure that is at least difficult to fully identify, and the technical solution of the present invention also provides a new idea for analyzing the structure of the branched polyethylene.

Compared with the ethylene propylene rubber, when the branched polyethylene has an appropriate number of secondary branch structures, the crosslinking point of the branched polyethylene can be generated on the tertiary carbon of the backbone or on the branched tertiary carbon of the secondary structure during the peroxide crosslinking or radiation crosslinking. Therefore, the rubber network formed by the peroxide crosslinking or radiation crosslinking of the branched polyethylene has richer C—C bonding segments between the backbones than the ethylene propylene rubber, which can effectively avoid the stress concentration, and contribute to better mechanical properties. On the other hand, a better crosslinking capability can effectively improve the crosslinking density, and the molecular weight distribution of the branched polyethylene is close to 2, which is narrower than that of common ethylene propylene rubber, so that it is expected to achieve better compression set resistance.

In a further technical solution, based on 100 parts by weight of the rubber matrix, the content of a plasticizer is 40 to 135 parts.

In a further technical solution, 100 parts by weight of the rubber matrix includes A parts of branched polyethylene, in which $10 \leq A \leq 100$, and B parts of EPM and EPDM, in which $0 \leq B \leq 90$, and the branched polyethylene is an ethylene homopolymer having a degree of branching of 60 to 130 branches/1000 carbon atoms, a weight average molecular weight of 66,000 to 518,000, and a Mooney viscosity ML(1+4) at 125° C. of 6 to 102.

In a further technical solution, 100 parts by weight of the rubber matrix includes A parts of branched polyethylene, in which $10 \leq A \leq 100$, and B parts of EPM and EPDM, in which $0 \leq B \leq 90$, and the branched polyethylene is an ethylene homopolymer having a degree of branching of 70 to 116 branches/1000 carbon atoms, a weight average molecular weight of 201,000 to 436,000, and a Mooney viscosity ML(1+4) at 125° C. of 23 to 101.

In a further technical solution, 100 parts by weight of the rubber matrix includes A parts of branched polyethylene, in which $10 \leq A \leq 100$, and B parts of EPM and EPDM, in which $0 \leq B \leq 90$, and the branched polyethylene is an ethylene homopolymer having a degree of branching of 80 to 105 branches/1000 carbon atoms, a weight average molecular weight of 250,000 to 400,000, and a Mooney viscosity ML(1+4) at 125° C. of 40 to 95.

In a further technical solution, 100 parts by weight of the rubber matrix includes A parts of branched polyethylene, in which $10 \leq A \leq 100$, and B parts of EPM and EPDM, in which $0 \leq B \leq 90$, and the branched polyethylene is an ethylene homopolymer having a degree of branching of 80 to 105 branches/1000 carbon atoms, a weight average molecular weight of 268,000 to 356,000, and a Mooney viscosity ML(1+4) at 125° C. of 42 to 80.

A third monomer of the EPDM is preferably a diene monomer, particularly selected from 5-ethylidene-2-norbornene, -vinyl-2-norbornene, dicyclopentadiene, 1,4-hexadiene, 1,5-hexadiene, 1,4-pentadiene, 2-methyl-1,4-pentadiene, 3-methyl-1,4-hexadiene, 4-methyl-1,4-hexadiene, 1,9-decadiene, 5-methylene-2-norbornene, 5-pentylene-2-norbornene, 1,5-cyclooctadiene, 1,4-cyclooctadiene, and the like. Particularly, the ethylene propylene rubber can simultaneously include two or more diene monomers. For example, the ethylene propylene rubber can simultaneously include 5-ethylidene-2-norbornene and 5-vinyl-2-norbornene. The functional group of the diene monomer can play the same role as an intrinsic auxiliary crosslinking agent in peroxide vulcanization to improve the crosslinking efficiency, thereby being favorable for reducing the dosage and residual quantity of the required crosslinking agents and auxiliary crosslinking agents and lowering the cost required for adding the crosslinking agents and the auxiliary crosslinking agents. The weight ratio of the diene monomer in the ethylene propylene rubber is preferably 1% to 14%, more preferably 3% to 10%, and further preferably 4% to 7%.

In a further technical solution, the crosslinking agent includes at least one of sulfur and a peroxide crosslinking agent, and the peroxide crosslinking agent includes at least one of di-tert-butyl peroxide, dicumyl peroxide, tert-butyl cumyl peroxide, 1,1-tert-butyl peroxide-3,3,5-trimethylcyclohexane, 2,5-dimethyl-2,5-di(tert-butylperoxy)hexane, 2,5-dimethyl-2,5-di(tert-butylperoxy)hexyne-3, bis(tert-butylperoxyisopropyl)benzene, 2,5-dimethyl-2,5-bis(benzoylperoxy)hexane, tert-butyl peroxybenzoate, and tert-butylperoxy-2-ethylhexyl carbonate.

In a further technical solution, the auxiliary crosslinking agent includes at least one of triallyl cyanurate, triallyl isocyanurate, ethylene glycol dimethacrylate, triethylene glycol dimethacrylate, triallyl trimellitate, trimethylolpropane trimethacrylate, N,N'-m-phenylene bismaleimide, N,N'-bis(furfurylidene)acetone, 1,2-polybutadiene, sulfur, and a metal salt of unsaturated carboxylic acid. The metal salt of unsaturated carboxylic acid includes at least one of zinc acrylate, zinc methacrylate, magnesium methacrylate, calcium methacrylate, and aluminum methacrylate. The triallyl cyanurate, the triallyl isocyanurate, the ethylene glycol dimethacrylate, the triethylene glycol dimethacrylate, and the trimethylolpropane trimethacrylate are auxiliary crosslinking agents with a radiation sensitization function.

In a further technical solution, based on 100 parts by weight of the rubber matrix, the crosslinking system also includes 0 to 3 parts of a vulcanization accelerator, and the vulcanization accelerator includes at least one of 2-mercaptobenzothiazole, dibenzothiazyl disulfide, tetramethylthiuram monosulfide, tetramethylthiuram disulfide, tetraethylthiuram disulfide, zinc di-n-butyl dithiocarbamate, N-cyclohexyl-2-benzothiazolesulfenamide, N,N-dicyclohexyl-2-benzothiazolesulfenamide, bismaleimide, and ethylene thiourea.

In a further technical solution, the plasticizer includes at least one of stearic acid, pine tar, engine oil, naphthenic oil, paraffin oil, coumarone resin, RX-80 (a medium molecular weight resin formed by esterification of xylene formaldehyde resin and rosin, as described in Xiao, Shuhong et al., *RX-80 Resin synthesis and Application*, RUBBER & PLASTICS RESOURCES UTILIZATION, 2001, (3), p 15-18), and paraffin. The reasonable use of the plasticizer can increase the elasticity of the rubber compound and the plasticity suitable for technological operation. In order to increase the adhesion, additives with a tackifying effect, such as pine tar, coumarone, RX-80 and liquid polyisobutylene, can also be used preferably. When compound rubber products, such as foamed solid compound sealing strips, are produced, the rubber compound having certain adhesion is favorable for forming.

In a further technical solution, the reinforcing filler includes at least one of carbon black, calcium carbonate, calcined clay, magnesium silicate, aluminum silicate, and magnesium carbonate.

In a further technical solution, the metal oxide includes at least one of zinc oxide, magnesium oxide, and calcium oxide.

In a further technical solution, the rubber composition also includes auxiliary components, and based on 100 parts by weight of the rubber matrix, the auxiliary components include, in parts by weight, 1 to 3 parts of a stabilizer and 1 to 10 parts of polyethylene glycol.

In a further technical solution, the stabilizer includes at least one of 2,2,4-trimethyl-1,2-dihydroquinoline polymer (RD), 6-ethoxy-2,2,4-trimethyl-1,2-dihydroquinoline (AW), and 2-mercaptobenzimidazole (MB).

In a further technical solution, the polyethylene glycol includes at least one of polyethylene glycol of which the molecular weight is 2000, polyethylene glycol of which the molecular weight is 3400, and polyethylene glycol of which the molecular weight is 4000.

The rubber composition of the present invention can exist in a form of a non-crosslinked rubber mix, and can exist in a form of vulcanized rubber after a further crosslinking reaction. The vulcanized rubber can also be simply referred to as a vulcanizate.

The present invention also provides a method for preparing the rubber composition. The preparation method comprises the following steps:
(1) setting the temperature and the rotor speed of an internal mixer, sequentially adding other components of the used rubber composition than the crosslinking system to the internal mixer, and performing mixing; then, adding the crosslinking system, performing mixing, and then, discharging the rubber;
(2) plasticating the rubber mix obtained in step (1) on an open mill, unloading a sheet, and allowing the sheet to stand;
(3) filling the rubber mix into a cavity of a mold, vulcanizing the rubber mix on a press vulcanizer by heating and pressing, and releasing the vulcanized product from the mold to obtain vulcanized rubber. In order to improve the compression set resistance of the vulcanized rubber, a post vulcanization process can be further used for vulcanization.

The present invention provides a sealing element, and the rubber compound used for the sealing element includes the rubber composition. The said sealing element could be a sealing strip, and the rubber compound used for the sealing strip includes the rubber composition.

The present invention provides a method for producing the sealing strip, which comprises the following steps:
(1) mixing: preparing the rubber composition into a rubber mix in an internal mixer, automatically discharging the rubber mix to a double screw extruder so as to be extruded into a sheet, cooling the rubber mix in a rubber sheet cooling machine, and automatically discharging the rubber mix to a pallet so as to be packaged and formed after the rubber mix is cooled to room temperature;
(2) extrusion and vulcanization: performing an extrusion and vulcanization process by using a vacuumizing extruder, wherein the head temperature of the extruder is set to be 90 to 100° C., the screw temperature is set to be 70 to 80° C., the head pressure is controlled at 15 to 20 MPa, and the rotation speed of the extruder is 25 to 30 r/min; performing a salt bath vulcanization process, wherein the temperature of a spraying section is 240 to 260° C., the temperature of a steeping section is 210 to 230° C., the temperature of a steeping press section is 210 to 230° C., the transmission speed is 35 to 45 m/min, and the temperature of a cooling section is 25 to 30° C.;
(3) performing cooling, trimming and cutting to obtain a finished product.

The present invention also provides a foamed solid compound sealing strip, and the rubber compound used for a solid part includes the rubber composition.

The present invention also provides a method for producing the foamed solid compound sealing strip, which comprises the following steps:
(1) mixing: separately performing mixing in an internal mixer to obtain the rubber mix for a solid part and a foaming part, performing open milling on an open mill, unloading a sheet, cooling the sheet, and allowing the sheet to stand;
(2) compound extrusion and vulcanization: co-extruding and forming the rubber mix for the solid part and the vulcanized rubber for the foaming part by a compound head, wherein the head temperature of an extruder is set to be 90 to 100° C., the screw temperature is set to be 70 to 80° C., the head pressure is controlled at 15 to 20 MPa, and the rotation speed of the extruder is 25 to 30 r/min; performing a salt bath vulcanization process, wherein the temperature of a spraying section is 250° C., the temperature of a steeping section is 220° C., the temperature of a steeping press section is 220° C., the transmission speed is 35 to 45 m/min, and the temperature of a cooling section is 25 to 30° C.;

(3) performing cooling, trimming and cutting to obtain a finished product.

The present invention also provides a method for producing the sealing strip, the vulcanization process of the production method comprises two vulcanization processes of pre-vulcanization and heat vulcanization, and the pre-vulcanization includes at least one of radiation pre-vulcanization and microwave pre-vulcanization. The pre-vulcanization can impart certain strength to the rubber, thereby ensuring that the rubber sealing strip can withstand the external force without deformation during rapid continuous processing, and improving the production efficiency and product quality of the sealing strip. When the rubber composition of the present invention includes an auxiliary cross-linking agent having a radiation sensitization function, the radiation pre-vulcanization method is preferred because the radiation pre-vulcanization method has the following advantages as compared with the microwave pre-vulcanization method: (1) the radiation pre-vulcanization method has no requirement for the polarity of the formula or the rubber, and thus is more suitable for a rubber composition containing branched polyethylene; (2) the radiation pre-vulcanization method can be completed at normal temperature to avoid the problems of heat thinning and size deformation of the rubber; (3) the degree of crosslinking can be adjusted by controlling the radiation dose, and thus, the control is convenient. The production method is suitable for solid sealing strips, foamed sealing strips and foamed solid compound sealing strips.

The present invention also provides a mixing process of the rubber composition. When a rubber matrix contains EPDM and sulfur is mainly used as a vulcanizing agent for the EPDM in a crosslinking system, the rubber mixing steps are as follows:

(1) mixing the EPDM, sulfur, vulcanization accelerator and remaining components metered according to the weight ratio of the EPDM in the rubber composition by a conventional process so as to obtain a master batch, and mixing the remaining components in the rubber composition by a conventional process so as to obtain a master batch;

(2) fully mixing the two master batches in an internal mixer so as to obtain a finished batch, performing open milling on an open mill, then, unloading a sheet, and allowing the sheet to stand for vulcanization.

The above mixing process can ensure that most of the sulfur finally remains in the EPDM phase and a small part of the sulfur enters the remaining rubber matrix phase as an auxiliary crosslinking agent for peroxide vulcanization, so that various effects of the sulfur can be effectively exerted.

In a heating vulcanization method of the rubber composition provided by the present invention, heating tanks and metal molds having heating modes such as hot air, glass bead fluidized beds, ultra-high frequency electromagnetic waves (UHF) and steam and hot molten salt baths (LCM) can be used. The heating temperature is preferably 150 to 170° C., and the heating time is preferably 1 to 30 min.

In an electron beam radiation vulcanization method of the rubber composition provided by the present invention, the energy of electron beams is preferably 0.1 to 10 MeV, and further preferably 0.3 to 2 MeV. By means of radiation, the absorbed dose is preferably 5 to 350 kGy, and further preferably 5 to 100 kGy.

The solid sealing strip produced by using the rubber composition of the present invention and the foamed solid compound sealing strip containing the rubber composition of the present invention can be applied to the automobile industry and the building industry, and specifically can be used as sealing strips for engine covers, sealing strips for door frames, sealing strips for front windshields, sealing strips for rear windshields, sealing strips for side windows, sealing strips for skylights, primary door seals, sealing strips for glass run channels, sealing strips for trunks, sealing strips for back doors, buffer strips for back doors, sealing strips for upper machine covers of air chamber covering parts, sealing strips for doors and windows of buildings, waterproof sealing strips for buildings, and the like.

Compared with the prior art, the present invention has the beneficial effects that the molecular structure of the branched polyethylene is similar to that of the ethylene propylene rubber, the molecular structure is completely saturated, the aging resistance is excellent, the molecular weight distribution is generally less than 2.5 and is mostly 1.7 to 2.1, the molecular weight distribution is narrower, and the branched polyethylene, like the ethylene propylene rubber, can be vulcanized by using peroxides, so that after the branched polyethylene as a rubber component is added to the formula of the rubber composition, a rubber compound or a product obtained after vulcanization of the rubber composition has good compression set resistance.

DETAILED DESCRIPTION

The present invention is further described through embodiments, but such embodiments are not intended to limit the scope of the present invention. Some non-essential improvements and adjustments made by those skilled in the art to the present invention shall also fall within the protection scope of the present invention.

In order to more clearly describe the embodiments of the present invention, the materials involved in the present invention are defined below. The materials used for the rubber matrix in the present invention are as follows:

The Mooney viscosity ML(1+4) at 125° C. of the used EPM is preferably 30 to 60, and the ethylene content is preferably in the range of 40% to 60%.

The Mooney viscosity ML(1+4) at 125° C. of the used EPDM is preferably 20 to 100, and further preferably 50 to 80, the ethylene content is preferably in the range of 50% to 70%, a third monomer is preferably 5-ethylidene-2-norbornene, 5-vinyl-2-norbornene or dicyclopentadiene, and the content of the third monomer is 1% to 7%.

The used branched polyethylene can be obtained by catalyzing ethylene homopolymerization by an (α-diimine) nickel catalyst under the action of a co-catalyst. The structure and synthesis method of the used (α-diimine) nickel catalyst and the method for preparing the branched polyethylene by the (α-diimine) nickel catalyst are disclosed in the prior art, and can use but are not limited to the following literatures: CN102827312A, CN101812145A, CN101531725A, CN104926962A, U.S. Pat. Nos. 6,103,658, and 6,660,677.

The branched polyethylene has the following characteristics: the degree of branching is 60 to 130 branches/1000 carbon atoms, the weight average molecular weight is 66,000 to 518,000, and the Mooney viscosity ML(1+4) at 125° C. is 6 to 102. The degree of branching is measured by means of nuclear magnetic hydrogen spectroscopy, and the molar percentages of various branches are measured by means of nuclear magnetic carbon spectroscopy.

Specific details are as follows.

| Branched polyethylene No. | Degree of branching | Methyl/% | Ethyl/% | Propyl/% | Butyl/% | Pentyl/% | Hexyl or higher/% | Weight average molecular weight/10,000 | Molecular weight distribution | Mooney viscosity ML(1 + 4) at 125° C. |
|---|---|---|---|---|---|---|---|---|---|---|
| PER-1 | 130 | 46.8 | 18.3 | 8.3 | 6.7 | 5.2 | 14.7 | 6.6 | 2.2 | 6 |
| PER-2 | 116 | 51.2 | 17.6 | 8.2 | 5.8 | 5.1 | 12.1 | 20.1 | 2.1 | 23 |
| PER-3 | 105 | 54.0 | 13.7 | 6.4 | 5.3 | 5.1 | 15.5 | 26.8 | 2.1 | 42 |
| PER-4 | 102 | 56.2 | 12.9 | 6.2 | 5.2 | 4.9 | 14.6 | 27.9 | 2.1 | 52 |
| PER-5 | 99 | 59.6 | 11.6 | 5.8 | 4.9 | 5.1 | 13.0 | 28.3 | 1.8 | 63 |
| PER-6 | 90 | 62.1 | 9.4 | 5.4 | 4.6 | 4.5 | 14.0 | 32.1 | 2.1 | 77 |
| PER-7 | 82 | 64.2 | 8.7 | 5.3 | 4.2 | 3.9 | 13.7 | 35.6 | 1.7 | 80 |
| PER-8 | 70 | 66.5 | 7.2 | 4.6 | 3.2 | 3.2 | 15.3 | 43.6 | 2.1 | 93 |
| PER-9 | 60 | 68.1 | 7.1 | 4.2 | 2.7 | 2.8 | 15.1 | 51.8 | 2.2 | 102 |
| PER-10 | 87 | 61.8 | 10.3 | 5.4 | 4.6 | 4.9 | 12.0 | 40.1 | 1.8 | 101 |
| PER-11 | 94 | 60.5 | 10.8 | 5.7 | 4.7 | 4.9 | 13.3 | 37.8 | 2.0 | 85 |
| PER-12 | 102 | 56.8 | 12.7 | 6.1 | 5.2 | 5.1 | 13.9 | 34.8 | 1.9 | 66 |

Unless otherwise stated, rubber performance test methods are as follows:
1. Hardness test: the test is performed by using a hardness tester in accordance with the national standard GB/T 531.1-2008, wherein the test temperature is room temperature.
2. Tensile strength and elongation at break performance test: the test is performed by using an electronic tensile tester in accordance with the national standard GB/T528-2009, wherein the tensile speed is 500 mm/min, the test temperature is 23±2° C., and the sample is a type 2 dumbbell-shaped sample.
3. Mooney viscosity test: the test is performed by using a Mooney viscosity tester in accordance with the national standard GB/T1232.1-2000, wherein the test temperature is 125° C., the preheating time is 1 min, and the test time is 4 min.
4. Compression set test: the test is performed by using a compression set device in accordance with the national standard GB/T7759-1996, wherein a type B sample is used, the amount of compression is 25%, and the test temperature is 70° C.
5. Test of top optimum cure time Tc90: the test is performed in a rotorless vulcanizer in accordance with the national standard GB/T16584-1996, wherein the test temperature is 170° C.

The vulcanization conditions of the following Examples 1 to 12 and comparative Examples 1 and 2 are unified as follows: the temperature is 170° C., the pressure is 16 MPa, and the time is Tc90+1 min.

The embodiment of the rubber composition provided by the present invention is as follows: the rubber composition includes a rubber matrix and essential components in parts by weight, wherein the rubber matrix includes A parts of branched polyethylene, in which 10≤A≤100, and B parts of EPM and EPDM, in which 0≤B≤90; and based on 100 parts by weight of the rubber matrix, the essential components include 2 to 20 parts of a crosslinking system, 60 to 300 parts of a reinforcing filler, 20 to 170 parts of a plasticizer, and 3 to 25 parts of a metal oxide.

The branched polyethylene has a degree of branching of 60 to 130 branches/1000 carbon atoms, a weight average molecular weight of 66,000 to 518,000, and a Mooney viscosity ML(1+4) at 125° C. of 6 to 102. The crosslinking system includes a crosslinking agent and an auxiliary crosslinking agent.

The crosslinking agent provided by the present invention includes at least one of sulfur and a peroxide crosslinking agent, and the peroxide crosslinking agent includes at least one of di-tert-butyl peroxide, dicumyl peroxide, tert-butyl cumyl peroxide, 1,1-tert-butyl peroxide-3,3,5-trimethylcyclohexane, 2,5-dimethyl-2,5-di(tert-butylperoxy)hexane, 2,5-dimethyl-2,5-di(tert-butylperoxy)hexyne-3, bis(tert-butylperoxyisopropyl)benzene, 2,5-dimethyl-2,5-bis(benzoylperoxy)hexane, tert-butyl peroxybenzoate, and tert-butylperoxy-2-ethylhexyl carbonate. The auxiliary crosslinking agent includes at least one of triallyl cyanurate, triallyl isocyanurate, ethylene glycol dimethacrylate, triethylene glycol dimethacrylate, triallyl trimellitate, trimethylolpropane trimethacrylate, N,N'-m-phenylene bismaleimide, N,N'-bis(furfurylidene)acetone, 1,2-polybutadiene, sulfur, zinc acrylate, zinc methacrylate, magnesium methacrylate, calcium methacrylate, and aluminum methacrylate. The plasticizer includes at least one of stearic acid, pine tar, engine oil, naphthenic oil, paraffin oil, coumarone resin, RX-80, and paraffin. The reinforcing filler includes at least one of carbon black, calcium carbonate, calcined clay, magnesium silicate, aluminum silicate, and magnesium carbonate. The metal oxide includes at least one of zinc oxide, magnesium oxide, and calcium oxide.

The crosslinking system of the present invention also includes 0 to 3 parts of a vulcanization accelerator, wherein the vulcanization accelerator includes at least one of 2-mercaptobenzothiazole, dibenzothiazyl disulfide, tetramethylthiuram monosulfide, tetramethylthiuram disulfide, tetraethylthiuram disulfide, zinc di-n-butyl dithiocarbamate, N-cyclohexyl-2-benzothiazolesulfenamide, N,N-dicyclohexyl-2-benzothiazolesulfenamide, bismaleimide, and ethylene thiourea.

The rubber composition of the present invention also includes 1 to 3 parts by weight of a stabilizer and 1 to 10 parts by weight of polyethylene glycol. The stabilizer includes at least one of 2,2,4-trimethyl-1,2-dihydroquinoline polymer (RD), 6-ethoxy-2,2,4-trimethyl-1,2-dihydroquinoline (AW), and 2-mercaptobenzimidazole (MB). The polyethylene glycol includes at least one of polyethylene glycol of which the molecular weight is 2000, polyethylene glycol of which the molecular weight is 3400, and polyethylene glycol of which the molecular weight is 4000.

Example 1

Branched polyethylene No. PER-9 was used.
The processing steps of the tested rubber composition were as follows:
(1) mixing: the temperature of an internal mixer was set to be 80° C. and the rotor speed was set to be 50 r/min, 90 parts of EPDM and 10 parts of branched polyethylene were added, and pre-pressing and mixing were performed for 90 s; 10 parts of zinc oxide, 1.5 parts of stearic acid, 5 parts of calcium oxide, and 3 parts of PEG3400 were added, and mixing was performed for 1 min;
(2) then, 120 parts of carbon black N550, 30 parts of calcium carbonate, and 90 parts of paraffin oil SUN-PAR2280 were added to the rubber compound, and mixing was performed for 3 min;
(3) finally, 4 parts of a crosslinking agent dicumyl peroxide (DCP), 1.5 parts of an auxiliary crosslinking agent triallyl isocyanurate (TAIC), and 0.3 part of sulfur were added, mixing was performed for 2 min, and then, the rubber was discharged;
(4) the rubber mix was plasticated on an open mill of which the roller temperature was 60° C. to obtain a sheet of which the thickness was about 2.5 mm, and the sheet was allowed to stand for 20 h;
(5) vulcanization was performed, the vulcanized product was allowed to stand for 16 h, and then, various tests were performed.

Example 2

Branched polyethylene No. PER-8 was used.
The processing steps of the tested rubber composition were as follows:
(1) mixing: the temperature of an internal mixer was set to be 80° C. and the rotor speed was set to be 50 r/min, 20 parts of EPM, 50 parts of EPDM, and 30 parts of branched polyethylene were added, and pre-pressing and mixing were performed for 90 s; 15 parts of zinc oxide, 2 parts of stearic acid, 10 parts of calcium oxide, and 3 parts of PEG3400 were added, and mixing was performed for 1 min;
(2) then, 120 parts of carbon black N550, 30 parts of calcium carbonate, and 80 parts of paraffin oil SUN-PAR2280 were added to the rubber compound, and mixing was performed for 3 min;
(3) finally, 4 parts of a crosslinking agent dicumyl peroxide (DCP), 1.5 parts of an auxiliary crosslinking agent triallyl isocyanurate (TAIC), and 0.3 part of sulfur were added, mixing was performed for 2 min, and then, the rubber was discharged;
(4) the rubber mix was plasticated on an open mill of which the roller temperature was 60° C. to obtain a sheet of which the thickness was about 2.5 mm, and the sheet was allowed to stand for 20 h;
(5) vulcanization was performed, the vulcanized product was allowed to stand for 16 h, and then, various tests were performed.

Example 3

Branched polyethylene No. PER-5 was used.
The processing steps of the tested rubber composition were as follows:
(1) mixing: the temperature of an internal mixer was set to be 80° C. and the rotor speed was set to be 50 r/min, 50 parts of EPDM and 50 parts of branched polyethylene were added, and pre-pressing and mixing were performed for 90 s; 5 parts of zinc oxide, 1.5 parts of stearic acid, 5 parts of calcium oxide, and 3 parts of PEG3400 were added, and mixing was performed for 1 min;
(2) then, 120 parts of carbon black N550, 30 parts of calcium carbonate, and 80 parts of paraffin oil SUN-PAR2280 were added to the rubber compound, and mixing was performed for 3 min;
(3) finally, 4 parts of a crosslinking agent dicumyl peroxide (DCP), 1.5 parts of an auxiliary crosslinking agent triallyl isocyanurate (TAIC), and 0.3 part of sulfur were added, mixing was performed for 2 min, and then, the rubber was discharged;
(4) the rubber mix was plasticated on an open mill of which the roller temperature was 60° C. to obtain a sheet of which the thickness was about 2.5 mm, and the sheet was allowed to stand for 20 h;
(5) vulcanization was performed, the vulcanized product was allowed to stand for 16 h, and then, various tests were performed.

Example 4

Branched polyethylene No. PER-3 was used.
The processing steps of the tested rubber composition were as follows:
(1) mixing: the temperature of an internal mixer was set to be 80° C. and the rotor speed was set to be 50 r/min, 30 parts of EPDM and 70 parts of branched polyethylene were added, and pre-pressing and mixing were performed for 90 s; 5 parts of zinc oxide, 0.5 part of stearic acid, 5 parts of calcium oxide, and 2 parts of PEG3400 were added, and mixing was performed for 1 min;
(2) then, 60 parts of carbon black N550, 10 parts of calcium carbonate, and 20 parts of paraffin oil SUN-PAR2280 were added to the rubber compound, and mixing was performed for 3 min;
(3) finally, 1.4 parts of a crosslinking agent dicumyl peroxide (DCP), 0.4 part of an auxiliary crosslinking agent triallyl isocyanurate (TAIC), and 0.2 part of sulfur were added, mixing was performed for 2 min, and then, the rubber was discharged;
(4) the rubber mix was plasticated on an open mill of which the roller temperature was 60° C. to obtain a sheet of which the thickness was about 2.5 mm, and the sheet was allowed to stand for 20 h;
(5) vulcanization was performed, the vulcanized product was allowed to stand for 16 h, and then, various tests were performed.

Example 5

Branched polyethylene No. PER-5 was used.
The processing steps of the tested rubber composition were as follows:
(1) mixing: the temperature of an internal mixer was set to be 80° C. and the rotor speed was set to be 50 r/min, 100 parts of branched polyethylene was added, and pre-pressing and mixing were performed for 90 s; 5 parts of zinc oxide, 1.5 parts of stearic acid, 5 parts of calcium oxide, and 3 parts of PEG3400 were added, and mixing was performed for 1 min;
(2) then, 120 parts of carbon black N550, 30 parts of calcium carbonate, and 80 parts of paraffin oil SUN- PAR2280 were added to the rubber compound, and mixing was performed for 3 min;
(3) finally, 4 parts of a crosslinking agent dicumyl peroxide (DCP), 1.5 parts of an auxiliary crosslinking agent triallyl isocyanurate (TAIC), and 0.3 part of sulfur were added, mixing was performed for 2 min, and then, the rubber was discharged;
(4) the rubber mix was plasticated on an open mill of which the roller temperature was 60° C. to obtain a sheet of which the thickness was about 2.5 mm, and the sheet was allowed to stand for 20 h;
(5) vulcanization was performed, the vulcanized product was allowed to stand for 16 h, and then, various tests were performed.

Example 6

Branched polyethylene No. PER-6 was used.
The processing steps of the tested rubber composition were as follows:
(1) mixing: the temperature of an internal mixer was set to be 80° C. and the rotor speed was set to be 50 r/min, 50 parts of EPDM and 50 parts of branched polyethylene were added, and pre-pressing and mixing were performed for 90 s; 5 parts of zinc oxide and 1 part of stearic acid were added, and mixing was performed for 1 min;
(2) then, 80 parts of carbon black N550, 10 parts of calcium carbonate, and 60 parts of paraffin oil SUN-PAR2280 were added to the rubber compound, and mixing was performed for 3 min;
(3) finally, 3 parts of a crosslinking agent bis(tert-butylperoxyisopropyl)benzene (BIPB) and 1 part of an auxiliary crosslinking agent triallyl isocyanurate (TAIC) were added, mixing was performed for 2 min, and then, the rubber was discharged;
(4) the rubber mix was plasticated on an open mill of which the roller temperature was 60° C. to obtain a sheet of which the thickness was about 2.5 mm, and the sheet was allowed to stand for 20 h;
(5) vulcanization was performed, the vulcanized product was allowed to stand for 16 h, and then, various tests were performed.

Example 7

Branched polyethylene No. PER-6 was used.
The processing steps of the tested rubber composition were as follows:
(1) mixing: the temperature of an internal mixer was set to be 80° C. and the rotor speed was set to be 50 r/min, 100 parts of branched polyethylene was added, and pre-pressing and mixing were performed for 90 s; 5 parts of zinc oxide and 1 part of stearic acid were added, and mixing was performed for 1 min;
(2) then, 80 parts of carbon black N550, 10 parts of calcium carbonate, and 60 parts of paraffin oil SUN-PAR2280 were added to the rubber compound, and mixing was performed for 3 min;
(3) finally, 3 parts of a crosslinking agent bis(tert-butylperoxyisopropyl)benzene (BIPB) and 1 part of an auxiliary crosslinking agent triallyl isocyanurate (TAIC) were added, mixing was performed for 2 min, and then, the rubber was discharged;
(4) the rubber mix was plasticated on an open mill of which the roller temperature was 60° C. to obtain a sheet of which the thickness was about 2.5 mm, and the sheet was allowed to stand for 20 h;
(5) vulcanization was performed, the vulcanized product was allowed to stand for 16 h, and then, various tests were performed.

Example 8

Branched polyethylene No. PER-7 was used.
The processing steps of the tested rubber composition were as follows:
(1) mixing: the temperature of an internal mixer was set to be 80° C. and the rotor speed was set to be 50 r/min, 30 parts of EPM and 70 parts of branched polyethylene were added, and pre-pressing and mixing were performed for 90 s; 3 parts of zinc oxide, 5 parts of calcium oxide, and 2 parts of PEG3400 were added, and mixing was performed for 1 min;
(2) then, 80 parts of carbon black N550, 10 parts of calcium carbonate, and 40 parts of paraffin oil SUN-PAR2280 were added to the rubber compound, and mixing was performed for 3 min;
(3) finally, 4 parts of a crosslinking agent dicumyl peroxide (DCP), 1 part of an auxiliary crosslinking agent triallyl isocyanurate (TAIC), and 15 parts of an auxiliary crosslinking agent 1,2-polybutadiene were added, mixing was performed for 2 min, and then, the rubber was discharged;
(4) the rubber mix was plasticated on an open mill of which the roller temperature was 60° C. to obtain a sheet of which the thickness was about 2.5 mm, and the sheet was allowed to stand for 20 h;
(5) vulcanization was performed, the vulcanized product was allowed to stand for 16 h, and then, various tests were performed.

Example 9

Branched polyethylene No. PER-4 was used.
The processing steps of the tested rubber composition were as follows:
(1) mixing: the temperature of an internal mixer was set to be 70° C. and the rotor speed was set to be 50 r/min, 50 parts of EPDM and 50 parts of branched polyethylene were added, and pre-pressing and mixing were performed for 90 s; 3 parts of zinc oxide and 2 parts of PEG3400 were added, and mixing was performed for 1 min;
(2) then, 60 parts of carbon black N550 and 20 parts of paraffin oil SUNPAR2280 were added to the rubber compound, and mixing was performed for 3 min;
(3) finally, 1 part of a crosslinking agent dicumyl peroxide (DCP), 0.5 part of sulfur, 1 part of tetramethylthiuram disulfide, 1 part of tetramethylthiuram monosulfide, and 1 part of zinc di-n-butyl dithiocarbamate were added, mixing was performed for 2 min, and then, the rubber was discharged;
(4) the rubber mix was plasticated on an open mill of which the roller temperature was 60° C. to obtain a sheet of which the thickness was about 2.5 mm, and the sheet was allowed to stand for 20 h;
(5) vulcanization was performed, the vulcanized product was allowed to stand for 16 h, and then, various tests were performed.

Example 10

Branched polyethylene No. PER-5 was used.
The processing steps of the tested rubber composition were as follows:
(1) mixing: the temperature of an internal mixer was set to be 70° C. and the rotor speed was set to be 50 r/min, 50 parts of EPDM and 50 parts of branched polyethylene were added, and pre-pressing and mixing were performed for 90 s; 10 parts of zinc oxide, 3 parts of stearic acid, 7 parts of coumarone resin, 5 parts of calcium oxide, and 5 parts of PEG3400 were added, and mixing was performed for 1 min;
(2) then, 130 parts of carbon black N550, 70 parts of carbon black N774, 100 parts of calcium carbonate, and 160 parts of paraffin oil SUNPAR2280 were added to the rubber compound, and mixing was performed for 3 min;
(3) finally, 6 parts of a crosslinking agent dicumyl peroxide (DCP) and 2 parts of an auxiliary crosslinking agent triallyl isocyanurate (TAIC) were added, mixing was performed for 2 min, and then, the rubber was discharged;
(4) the rubber mix was plasticated on an open mill of which the roller temperature was 60° C. to obtain a sheet of which the thickness was about 2.5 mm, and the sheet was allowed to stand for 20 h;
(5) vulcanization was performed, the vulcanized product was allowed to stand for 16 h, and then, various tests were performed.

Example 11

Branched polyethylene Nos. PER-2 and PER-8 were used.
The processing steps of the tested rubber composition were as follows:
(1) mixing: the temperature of an internal mixer was set to be 70° C. and the rotor speed was set to be 50 r/min, 30 parts of EPDM, 20 parts of PER-2, and 50 parts of PER-8 were added, and pre-pressing and mixing were performed for 90 s; 10 parts of zinc oxide, 2 parts of stearic acid, 3 parts of coumarone resin, 5 parts of calcium oxide, and 5 parts of PEG3400 were added, and mixing was performed for 1 min;
(2) then, 150 parts of carbon black N550, 80 parts of calcium carbonate, and 130 parts of paraffin oil SUNPAR2280 were added to the rubber compound, and mixing was performed for 3 min;
(3) finally, 8 parts of a crosslinking agent dicumyl peroxide (DCP) and 3 parts of an auxiliary crosslinking agent triallyl isocyanurate (TAIC) were added, mixing was performed for 2 min, and then, the rubber was discharged;
(4) the rubber mix was plasticated on an open mill of which the roller temperature was 60° C. to obtain a sheet of which the thickness was about 2.5 mm, and the sheet was allowed to stand for 20 h;
(5) vulcanization was performed, the vulcanized product was allowed to stand for 16 h, and then, various tests were performed.

Example 12

Branched polyethylene No. PER-1 was used.
The processing steps of the tested rubber composition were as follows:
(1) mixing: the temperature of an internal mixer was set to be 80° C. and the rotor speed was set to be 50 r/min, 80 parts of EPDM and 20 parts of branched polyethylene were added, and pre-pressing and mixing were performed for 90 s; 10 parts of zinc oxide, 2 parts of stearic acid, 5 parts of calcium oxide, and 5 parts of PEG3400 were added, and mixing was performed for 1 min;
(2) then, 150 parts of carbon black N550, 80 parts of calcium carbonate, and 70 parts of paraffin oil SUNPAR2280 were added to the rubber compound, and mixing was performed for 3 min;
(3) finally, 5 parts of a crosslinking agent dicumyl peroxide (DCP) and 2 parts of an auxiliary crosslinking agent triallyl isocyanurate (TAIC) were added, mixing was performed for 2 min, and then, the rubber was discharged;
(4) the rubber mix was plasticated on an open mill of which the roller temperature was 60° C. to obtain a sheet of which the thickness was about 2.5 mm, and the sheet was allowed to stand for 20 h;
(5) vulcanization was performed, the vulcanized product was allowed to stand for 16 h, and then, various tests were performed.

Comparative Example 1

The processing steps of comparative example 1 of the tested rubber composition were as follows:
(1) mixing: the temperature of an internal mixer was set to be 80° C. and the rotor speed was set to be 50 r/min, 100 parts of EPDM was added, and pre-pressing and mixing were performed for 90 s; 5 parts of zinc oxide, 1.5 parts of stearic acid, 5 parts of calcium oxide, and 3 parts of PEG3400 were added, and mixing was performed for 1 min;
(2) then, 120 parts of carbon black N550, 30 parts of calcium carbonate, and 80 parts of paraffin oil SUNPAR2280 were added to the rubber compound, and mixing was performed for 3 min;
(3) finally, 4 parts of a crosslinking agent dicumyl peroxide (DCP), 1.5 parts of an auxiliary crosslinking agent triallyl isocyanurate (TAIC), and 0.3 part of sulfur were added, mixing was performed for 2 min, and then, the rubber was discharged;
(4) the rubber mix was plasticated on an open mill of which the roller temperature was 60° C. to obtain a sheet of which the thickness was about 2.5 mm, and the sheet was allowed to stand for 20 h;
(5) vulcanization was performed, the vulcanized product was allowed to stand for 16 h, and then, various tests were performed.

Comparative Example 2

The processing steps of comparative example 2 of the tested rubber composition were as follows:
(1) mixing: the temperature of an internal mixer was set to be 80° C. and the rotor speed was set to be 50 r/min, 100 parts of EPDM was added, and pre-pressing and mixing were performed for 9 0 s; 5 parts of zinc oxide and 1 part of stearic acid were added, and mixing was performed for 1 min;
(2) then, 80 parts of carbon black N550, 10 parts of calcium carbonate, and 60 parts of paraffin oil SUNPAR2280 were added to the rubber compound, and mixing was performed for 3 min;

(3) finally, 3 parts of a crosslinking agent bis(tert-butylperoxyisopropyl)benzene (BIPB) and 1 part of an auxiliary crosslinking agent triallyl isocyanurate (TAIC) were added, mixing was performed for 2 min, and then, the rubber was discharged;
(4) the rubber mix was plasticated on an open mill of which the roller temperature was 60° C. to obtain a sheet of which the thickness was about 2.5 mm, and the sheet was allowed to stand for 20 h;
(5) vulcanization was performed, the vulcanized product was allowed to stand for 16 h, and then, various tests were performed.

Comparative Analysis of Test Performance Data:

By means of comparative analysis of the rubber obtained by the above Examples and the rubber obtained by the comparative examples 1 and 2, the test performance data was as shown in the following table:

| Test Item | Example 1 | Example 2 | Example 3 | Example 4 | Example 5 | Example 6 | Example 7 | Example 8 | Example 9 | Example 10 | Example 11 | Example 12 | Comparative Example 1 | Comparative Example 2 |
|---|---|---|---|---|---|---|---|---|---|---|---|---|---|---|
| Hardness | 65 | 62 | 62 | 59 | 62 | 65 | 60 | 61 | 59 | 67 | 73 | 69 | 63 | 68 |
| Tensile strength/MPa | 7.5 | 7.4 | 7.4 | 8.9 | 8 | 11 | 12.4 | 11.2 | 11.6 | 8 | 8.2 | 8.6 | 7.2 | 10.2 |
| Elongation at break/% | 274 | 309 | 323 | 369 | 341 | 448 | 585 | 402 | 496 | 389 | 253 | 308 | 292 | 390 |
| compression set (type B sample, 70° C.*22 h) | 11 | 11 | 10 | 11 | 7 | 14 | 11 | 12 | 14 | 10 | 13 | 12 | 12 | 18 |

Example 13

The present example is a sealing strip for automobiles, and a production process thereof was as follows:
(1) mixing: the temperature of an internal mixer was set to be 80° C. and the rotor speed was set to be 50 r/min, 100 parts of branched polyethylene PER-5 was added, and pre-pressing and mixing were performed for 90 s; 5 parts of zinc oxide, 1.5 parts of stearic acid, 5 parts of calcium oxide, and 3 parts of PEG3400 were added, and mixing was performed for 1 min; then, 120 parts of carbon black N550, 30 parts of calcium carbonate, and 80 parts of paraffin oil SUNPAR2280 were added to the rubber compound, and mixing was performed for 3 min; finally, 4 parts of a crosslinking agent dicumyl peroxide (DCP), 1.5 parts of an auxiliary crosslinking agent triallyl isocyanurate (TAIC), and 0.3 part of sulfur were added, mixing was performed for 2 min, and then, the rubber was discharged; the rubber mix was automatically discharged to a double screw extruder so as to be extruded into a sheet, the rubber mix was cooled in a rubber sheet cooling machine, and the rubber mix was automatically discharged to a pallet so as to be packaged and formed after the rubber mix was cooled to room temperature;
(2) extrusion and vulcanization: an extrusion and vulcanization process was performed by using a vacuumizing extruder, wherein the head temperature of the extruder was set to be 90 to 100° C., the screw temperature was set to be 70 to 80° C., the head pressure was controlled at 15 to 20 MPa, and the rotation speed of the extruder was 25 to 30 r/min; a salt bath vulcanization process was performed, wherein the temperature of a spraying section was 250° C., the temperature of a steeping section was 220° C., the temperature of a steeping press section was 220° C., the transmission speed was 35 to 45 m/min, and the temperature of a cooling section was 25 to 30° C.;
(3) cooling, trimming and cutting were performed to obtain a finished product.

The performances of the tested vulcanized rubber were as shown in the following table:

| Test item | Normal value | Actual value | Test methods |
|---|---|---|---|
| Hardness | 60 ± 5 | 62 | GB/T 531 |
| Tensile strength/MPa | ≥7.0 | 10.2 | GB/T 528 |
| Elongation at break % | ≥250 | 341 | GB/T 528 |

-continued

| Test item | Normal value | Actual value | Test methods |
|---|---|---|---|
| Compression set (type B sample, 70° C.*22 h) | ≤50 | 7 | GB/T 7759 |
| After aging (70° C.*72 h) | | | |
| Hardness | 0 to +5 | +1 | GB/T 3512 |
| Change rate of tensile strength/% | −15 to +15 | −3 | |
| Change rate of elongation at break/% | −25 to 0 | −3 | |
| Brittleness temperature/° C. | −40 | −58 | GB/T 15256 |
| Ozone aging resistance, stretching 20%, 40° C., 72 h, ozone concentration: $2*10^{-6}$ | No cracks | No cracks | GB/T 7762 |

It can be known from the tested performances that the performances of the sealing strip produced by the rubber composition provided by the present invention were better than those of the sealing strip produced in the prior art.

Example 14

The present example is a sealing strip for automobiles, and a production process thereof was as follows:
(1) rubber mixing: the mixing process of the rubber compound used for a solid part was the same as that in Example 13;
(2) compound extrusion and vulcanization: the rubber mix for the solid part and the vulcanized rubber for a foaming part were co-extruded and formed by a compound head, wherein the head temperature of the extruder was set to be 90 to 100° C., the screw temperature was set to be 70 to 80° C., the head pressure was controlled at 15 to 20 MPa, and the rotation speed of the extruder was 25 to 30 r/min; a salt bath vulcanization process was performed, wherein the temperature of a spraying section was 250° C., the temperature of a steeping section was 220° C., the temperature of a steeping press section was 220° C., the transmission speed was 35 to 45 m/min, and the temperature of a cooling section was 25 to 30° C.;

(3) cooling, trimming and cutting were performed to obtain a finished product.

Example 15

The present example is a sealing strip for automobiles, and a production process thereof was as follows:
(1) mixing: the temperature of an internal mixer was set to be 80° C. and the rotor speed was set to be 50 r/min, 100 parts of branched polyethylene PER-5 was added, and pre-pressing and mixing were performed for 90 s; 5 parts of zinc oxide, 1.5 parts of stearic acid, 5 parts of calcium oxide, and 3 parts of PEG3400 were added, and mixing was performed for 1 min; then, 120 parts of carbon black N550, 30 parts of calcium carbonate, and 80 parts of paraffin oil SUNPAR2280 were added to the rubber compound, and mixing was performed for 3 min; finally, 4 parts of a crosslinking agent dicumyl peroxide (DCP), 1.5 parts of an auxiliary crosslinking agent trimethylolpropane trimethacrylate, and 0.3 part of sulfur were added, mixing was performed for 2 min, and then, the rubber was discharged; the rubber mix was automatically discharged to a double screw extruder so as to be extruded into a sheet, the rubber mix was cooled in a rubber sheet cooling machine, and the rubber mix was automatically discharged to a pallet so as to be packaged and formed after the rubber mix was cooled to room temperature;
(2) extrusion and vulcanization: an extrusion and vulcanization process was performed by using a vacuumizing extruder, wherein the head temperature of the extruder was set to be 50 to 60° C., the head pressure was controlled at 15 to 20 MPa, and the rotation speed of the extruder was 30 to 35 r/min; firstly, a radiation pre-vulcanization section was performed, wherein the electron beam energy for radiation was 1.0 MeV, and the radiation dose was 30 kGy; then, a salt bath vulcanization section was performed, wherein the temperature of a spraying section was 250° C., the temperature of a steeping section was 220° C., the temperature of a steeping press section was 220° C., the transmission speed was 50 to 60 m/min, and the temperature of a cooling section was 25 to 30° C.;
(3) cooling, trimming and cutting were performed to obtain a finished product.

Example 16

The present example is a sealing strip for automobiles, and a production process thereof was as follows:
(1) mixing: the temperature of an internal mixer was set to be 80° C. and the rotor speed was set to be 50 r/min, 70 parts of branched polyethylene PER-10 and 30 parts of EPDM having the ML(1+8) at 150° C. of 60, the ethylene content of 55% and the ENB content of 6.5% were added, and pre-pressing and mixing were performed for 90 s; 5 parts of zinc oxide, 1 part of stearic acid, 5 parts of calcium oxide, and 3 parts of PEG3400 were added, and mixing was performed for 1 min; then, 150 parts of carbon black N550, 80 parts of calcium carbonate, and 110 parts of paraffin oil SUNPAR2280 were added to the rubber compound, and mixing was performed for 3 min; finally, 4 parts of a crosslinking agent dicumyl peroxide (DCP), 1.5 parts of an auxiliary crosslinking agent trimethylolpropane trimethacrylate, and 0.3 part of sulfur were added, mixing was performed for 2 min, and then, the rubber was discharged; the rubber mix was automatically discharged to a double screw extruder so as to be extruded into a sheet, the rubber mix was cooled in a rubber sheet cooling machine, and the rubber mix was automatically discharged to a pallet so as to be packaged and formed after the rubber mix was cooled to room temperature;
(2) extrusion and vulcanization: an extrusion and vulcanization process was performed by using a vacuumizing extruder, wherein the head temperature of the extruder was set to be 50 to 60° C., the head pressure was controlled at 15 to 20 MPa, and the rotation speed of the extruder was 30 to 35 r/min; firstly, a radiation pre-vulcanization section was performed, wherein the electron beam energy for radiation was 1.0 MeV, and the radiation dose was 30 kGy; then, a salt bath vulcanization section was performed, wherein the temperature of a spraying section was 250° C., the temperature of a steeping section was 220° C., the temperature of a steeping press section was 220° C., the transmission speed was 50 to 60 m/min, and the temperature of a cooling section was 25 to 30° C.;
(3) cooling, trimming and cutting were performed to obtain a finished product.

Example 17

The present example is a sealing strip for automobiles, and a production process thereof was as follows:
(1) mixing: the temperature of an internal mixer was set to be 80° C. and the rotor speed was set to be 50 r/min, 100 parts of branched polyethylene PER-11 was added, and pre-pressing and mixing were performed for 90 s; 5 parts of zinc oxide, 1 part of stearic acid, 3 parts of calcium oxide, and 2 parts of PEG3400 were added, and mixing was performed for 1 min; then, 100 parts of carbon black N550, 20 parts of calcium carbonate, and 70 parts of paraffin oil SUNPAR2280 were added to the rubber compound, and mixing was performed for 3 min; finally, 4 parts of a crosslinking agent DCP, 1 part of an auxiliary crosslinking agent TAIC, and 0.3 part of sulfur were added, mixing was performed for 2 min, and then, the rubber was discharged; the rubber mix was automatically discharged to a double screw extruder so as to be extruded into a sheet, the rubber mix was cooled in a rubber sheet cooling machine, and the rubber mix was automatically discharged to a pallet so as to be packaged and formed after the rubber mix was cooled to room temperature;
(2) extrusion and vulcanization: an extrusion and vulcanization process was performed by using a vacuumizing extruder, wherein the head temperature of the extruder was set to be 90 to 100° C., the screw temperature was set to be 70 to 80° C., the head pressure was controlled at 15 to 20 MPa, and the rotation speed of the extruder was 25 to 30 r/min; a salt bath vulcanization process was performed, wherein the temperature of a spraying section was 250° C., the temperature of a steeping section was 220° C., the temperature of a steeping press section was 220° C., the transmission speed was 35 to 45 m/min, and the temperature of a cooling section was 25 to 30° C.;

(3) cooling, trimming and cutting were performed to obtain a finished product.

The rubber mix of the sealing strip was prepared into a test sample by means of mold pressing vulcanization, and by measurement, the hardness of the sample was 65, the tensile strength of the sample was 14.8 MPa, the elongation at break of the sample was 537%, and the compression set of the type B sample was 8% at 70° C.*22 h.

Example 18

The present example is a sealing strip for automobiles, and a production process thereof was as follows:

(1) mixing: the temperature of an internal mixer was set to be 80° C. and the rotor speed was set to be 50 r/min, 100 parts of branched polyethylene PER-11 was added, and pre-pressing and mixing were performed for 90 s; 5 parts of zinc oxide, 1 part of stearic acid, 3 parts of calcium oxide, and 2 parts of PEG3400 were added, and mixing was performed for 1 min; then, 120 parts of carbon black N550, 30 parts of calcium carbonate, and 80 parts of paraffin oil SUNPAR2280 were added to the rubber compound, and mixing was performed for 3 min; finally, 4 parts of a crosslinking agent DCP, 1.5 parts of an auxiliary crosslinking agent TAIC, and 0.3 part of sulfur were added, mixing was performed for 2 min, and then, the rubber was discharged; the rubber mix was automatically discharged to a double screw extruder so as to be extruded into a sheet, the rubber mix was cooled in a rubber sheet cooling machine, and the rubber mix was automatically discharged to a pallet so as to be packaged and formed after the rubber mix was cooled to room temperature;

(2) extrusion and vulcanization: an extrusion and vulcanization process was performed by using a vacuumizing extruder, wherein the head temperature of the extruder was set to be 90 to 100° C., the screw temperature was set to be 70 to 80° C., the head pressure was controlled at 15 to 20 MPa, and the rotation speed of the extruder was 25 to 30 r/min; a salt bath vulcanization process was performed, wherein the temperature of a spraying section was 250° C., the temperature of a steeping section was 220° C., the temperature of a steeping press section was 220° C., the transmission speed was 35 to 45 m/min, and the temperature of a cooling section was 25 to 30° C.;

(3) cooling, trimming and cutting were performed to obtain a finished product.

The rubber mix of the sealing strip was prepared into a test sample by means of mold pressing vulcanization, and by measurement, the hardness of the sample was 63, the tensile strength of the sample was 13.2 MPa, the elongation at break of the sample was 387%, and the compression set of the type B sample was 6% at 70° C.*22 h.

The superiority of the branched polyethylene in crosslinking capability was explained by the crosslinking performance test comparison of Examples 19 and 20 and a comparative example 3.

The rubber matrix used in Example 19 is 100 parts of PER-12. The rubber matrix used in Example 20 is 50 parts of PER-12 and 50 parts of EPDM (the Mooney viscosity ML(1+4) at 125° C. was 60, the ethylene content was 68%, and the ENB content was 4.8%.) The rubber matrix used in the comparative example 3 is 100 parts of EPDM used in Example 20. Other formulas were identical.

The processing steps of three rubber compositions were as follows:

(1) mixing: the temperature of an internal mixer was set to be 80° C. and the rotor speed was set to be 50 r/min, a rubber matrix was added, and pre-pressing and mixing were performed for 90 s; 5 parts of zinc oxide, 1.5 parts of stearic acid, 2 parts of PEG4000, and 5 parts of CaO were added, and mixing was performed for 1 min;

(2) then, 110 parts of carbon black N550, 50 parts of calcium carbonate, and 80 parts of paraffin oil were added to the rubber compound, and mixing was performed for 3 min;

(3) finally, 4 parts of a crosslinking agent DCP and 1.5 parts of an auxiliary crosslinking agent TAIC were added, mixing was performed for 2 min, and then, the rubber was discharged;

(4) the rubber mix was plasticated on an open mill of which the roller temperature was 60° C. to obtain a sheet of which the thickness was about 2.5 mm, the sheet was allowed to stand for 20 h, and then, the vulcanization performance was tested.

Test conditions: 175° C. 30 min Test results were as follows:

|  | Example 19 | Example 20 | Comparative example 3 |
|---|---|---|---|
| ML, dN · m | 2.07 | 1.71 | 1.79 |
| MH, dN · m | 16.12 | 14.82 | 16.67 |
| MH − ML, dN · m | 14.05 | 13.11 | 14.88 |
| Tc90, min | 5.2 | 6.2 | 7.5 |

The Tc90 of the rubber composition of Example 19 was the shortest and was 30% shorter than that of the comparative example 3, and the MH-ML value of the rubber composition of Example 19 was only slightly lower than that of the comparative example 3, indicating that the branched polyethylene used in this example could be better than the conventional EPDM in crosslinking capability.

What is claimed is:

1. A rubber composition, comprising a rubber matrix and certain essential components, wherein, said rubber matrix comprises, in parts by weight, a branched polyethylene with a content represented as A, 10≤A≤100 parts, and an EPM and an EPDM, with a total content represented as B, 0≤B<100 parts;

wherein A+B is equal to 100 total parts;

wherein, with respect to 100 parts by weight of the total amount of said rubber matrix, said certain essential components comprise 2~20 parts of a cross-linking system, 60~300 parts of a reinforcing filler, 20~170 parts of a plasticizer and 3-25 parts of a metal oxide;

wherein, said branched polyethylene comprises an ethylene homopolymer having a branching degree of from 50 to 60 branches/1000 carbon atoms, a weight-average molecular weight of from 250,000 to 400,000, and a mooney viscosity ML (1+4) 125° C. which is not less than 2; said cross-linking system comprises a cross-linking agent and an assistant cross-linking agent; and wherein the branched polyethylene is an elastomer.

2. The rubber composition according to claim 1, wherein the rubber matrix comprises a non-zero amount of EPM and a non-zero amount of EPDM.

3. The rubber composition according to claim 1, wherein, said cross-linking agent comprises at least one of a sulfur cross-linking agent and a peroxide cross-linking agent, and said peroxide cross-linking agent comprises at least one of di-tert-butyl peroxide, dicumyl peroxide, tert-butyl cumyl peroxide, 1,1-di-tert-butyl peroxide-3,3,5-trimethylcyclohexane, 2,5-dimethyl-2,5-di(tert-butyl peroxy)hexane, 2,5-dimethyl-2,5-di(tert-butyl peroxy)hexyne-3, bis(tert-butyl peroxy isopropyl)benzene, 2,5-dimethyl-2,5-bis(benzoyl peroxy)hexane, tert-butyl peroxybenzoate and tert-butylperoxy-2-ethylhexyl carbonate.

4. The rubber composition according to claim 1, wherein, said assistant cross-linking agent comprises at least one of triallyl cyanurate, triallyl isocyanurate, ethylene glycol dimethacrylate, triethylene glycol dimethacrylate, triallyl trimellitate, trimethacrylic acid trimethylolpropane ester, N,N'-m-phenylene bismaleimide, N,N'-bis-indenylene acetonone, 1,2-polybutadiene, sulfur and unsaturated carboxylic acid metal salts.

5. The rubber composition according to claim 1, wherein, said cross-linking system further comprises 0~3 parts of a vulcanization accelerator, with respect to 100 parts by weight of the total amount of said rubber matrix; said vulcanization accelerator comprises at least one of 2-thiol benzothiazole, dibenzothiazole disulfide, tetramethylthiuram monosulfide, tetramethylthiuram disulfide, tetraethyl thiuram disulfide, zinc di-n-butyldithiocarbamate, N-cyclohexyl-2-benzothiazolyl sulfenamide, N,N-dicyclohexyl-2-phenylthiazolyl sulfenamide, bismaleimide and ethylene thiourea.

6. The rubber composition according to claim 1, wherein, said plasticizer comprises at least one of stearic acid, pine tar, motor oil, naphthenic oil, paraffin oil, coumarone resin, and paraffin wax.

7. The rubber composition according to claim 1, wherein, said reinforcing filler comprises at least one of carbon black, calcium carbonate, calcined clay, magnesium silicate, aluminum silicate and magnesium carbonate.

8. The rubber composition according to claim 1, wherein, said metal oxide comprises at least one of zinc oxide, magnesium oxide and calcium oxide.

9. The rubber composition according to claim 1, wherein, said rubber composition further comprises auxiliary components; said auxiliary components comprise 1~3 parts of a stabilizer and 1~10 parts of polyethylene glycol by mass, with respect to 100 parts by weight of the total amount of said rubber matrix.

10. The rubber composition according to claim 9, wherein, said stabilizer comprises at least one of 2,2,4-trimethyl-1,2-dihydroquinoline polymer (RD), 6-ethoxy-2,2,4-trimethyl-1,2-dihydroquinoline (AW) and 2-mercaptobenzimidazole (MB).

11. The rubber composition according to claim 9, wherein, said polyethylene glycol comprises at least one of polyethylene glycol having a molecular weight of 2000, 3400, and 4000.

12. A sealing element, wherein the rubber compound used for said sealing element comprises said rubber composition according to claim 1.

13. The sealing element according to claim 12, wherein, said sealing element is a sealing strip, and the rubber compound used for said sealing element comprises said rubber composition.

14. A composite sealing strip with both foamed and solid parts, wherein the rubber compound used for the solid part of said composite sealing strip comprises said rubber composition according to claim 1.

* * * * *